(No Model.)

W. MURCHEY.
SCREW CUTTING DIE.

No. 363,754. Patented May 24, 1887.

Witnesses.
Jas. E. Maybee
Chas A Riches

Inventor.
Wm Murchey
by Donald C. Ridout & Co
Attys

ID

United States Patent Office.

WILLIAM MURCHEY, OF TORONTO, ONTARIO, CANADA.

SCREW-CUTTING DIE.

SPECIFICATION forming part of Letters Patent No. 363,754, dated May 24, 1887.

Application filed December 22, 1886. Serial No. 222,287. (No model.)

*To all whom it may concern:*

Be it known that I, WILLIAM MURCHEY, of the city of Toronto, in the county of York, in the Province of Ontario, Canada, machinist, have invented certain new and useful Improvements in Contracting and Expanding Dies for Hand or Machine Use, of which the following is a specification.

The object of the invention is to design simple and cheaply-constructed dies for either cutting a screw or turning down the end of a bar or rod; and it consists, essentially, of a mandrel having a head formed upon or attached to its end, in which head the die or cutter arms are pivoted, the cutter or die ends of the said arms being held open by a contracting-spring and held closed for cutting purposes by a conically-shaped adjustable collar fitted upon the mandrel, and having attached to it an adjustable gage-rod extending through the head of the mandrel in such a position that the end of the rod being cut must come in contact with its end, thereby pushing the collar away from the pivoted arms when the cutters have reached the end of the cut desired.

Figure 1:
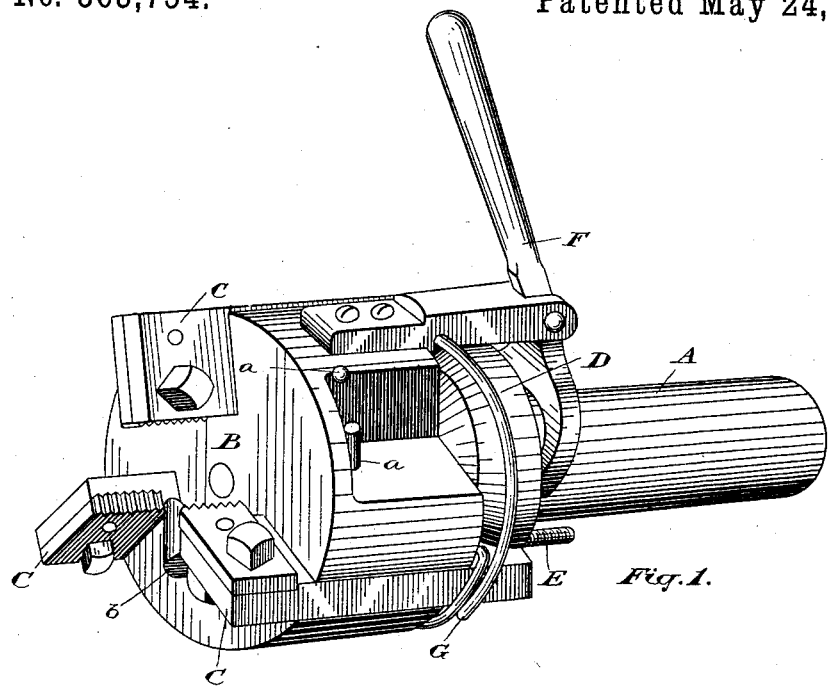
Figure 2:
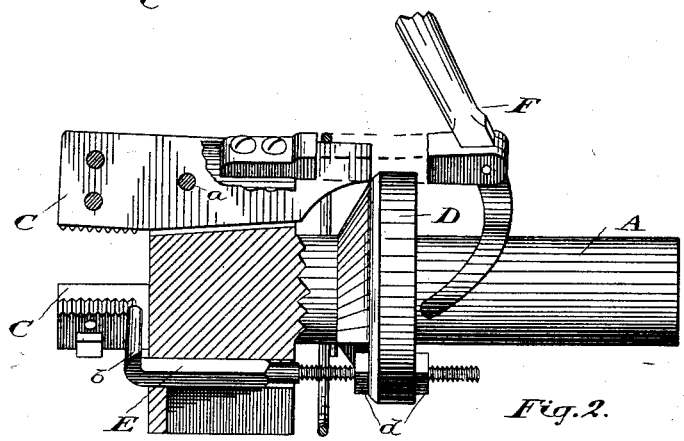

Figure 1 is a perspective view of my contracting and expanding die. Fig. 2 is a side view of the same, showing the head of the mandrel in section.

A is the mandrel, having a head, B, attached to or formed upon it.

C represents the cutter-arms, which are fitted into slots made in the head B and pivoted therein at *a*.

D is a collar, loosely fitting the mandrel A, and having its inner side beveled or conically-shaped.

E is a gage-rod, passing through a hole in the head B, and preferably having a head, *b*, formed on its outer end. The shank of the gage-rod E is screwed, as shown, and passes through a hole in the collar D, as indicated. A nut, *d*, is placed on each side of the collar D, so that the gage-rod E may be readily adjusted longitudinally, for the purpose hereinafter described.

F is a pivoted forked lever, the fork of the lever being behind the collar D, so that the said collar may be readily pushed toward the head B below the inner ends of the cutter-arms C. A contracting-spring, G, is wrapped around the inner ends of the arms C, so that the said ends of these arms shall be held in by the action of the spring when the collar D is pushed away from them.

In the drawings I show screwed eyes fixed to the outer ends of the arms C, which screwed eyes can readily be replaced by plain cutters, if desired.

From the foregoing description, assisted by the accompanying drawings, the construction of my device will readily be understood, and very few words will suffice to explain its operation.

The gage-rod is first set so that the end of the bar being cut will come in contact with the head *b* of the gage-rod at the point where it is desired that the cut shall end, and the collar D is pushed below the inner ends of the arms C, so as to throw the cutter ends of the said arms into the desired position for cutting. The end of the bar to be cut is then entered between the cutters, and as either the bar or mandrel revolves the cutters soon reach the point where the thread or cut is to end, at which point the end of the bar being cut comes in contact with the head *b*, and the gage-rod E is pushed so as to carry the collar D clear of the inner end of the arms C, when, by the action of the spring G, the said inner ends are drawn down and the cutter ends of the arms C are thrown out, so as to carry the cutters clear of the bar being turned or screwed.

What I claim as my invention is—

1. The combination, with the head B and cutters C, pivoted therein, of the collar D, and the lever F, pivoted to an arm attached to and moving with said head and actuating said collar, substantially as described.

2. The combination, with the head B and pivoted cutters C, of the movable collar D, gage-rod E, having a shank secured to said collar, and the lever F, pivoted to said head and engaging said collar, substantially as described.

3. The combination, with the head B and pivoted cutters C, of the movable collar D, gage-rod E, having a shank adjustably secured to said collar, and the lever F, pivoted to said head and engaging said collar, substantially as described.

4. The device described, consisting of the slotted head B, mandrel A, cutters C, pivoted in the slots of said head, the movable collar D on said mandrel, the forked lever F, pivoted to said head and engaging said collar, the gage-rod E, passed through the head and having a shank engaging the collar, and a contracting-spring, G, around the inner ends of the cutter-arms, all substantially as described.

Toronto, November 20, 1886.

WILLIAM MURCHEY.

In presence of—
CHARLES C. BALDWIN,
CHAS. H. RECHES.